Aug. 2, 1960                R. GOUIRAND                2,947,547
         TRACTOR-TRAILER ASSEMBLY INCLUDING A PNEUMATIC
Filed June 8, 1955        SUSPENSION FOR THE TRAILER
                                              4 Sheets-Sheet 1
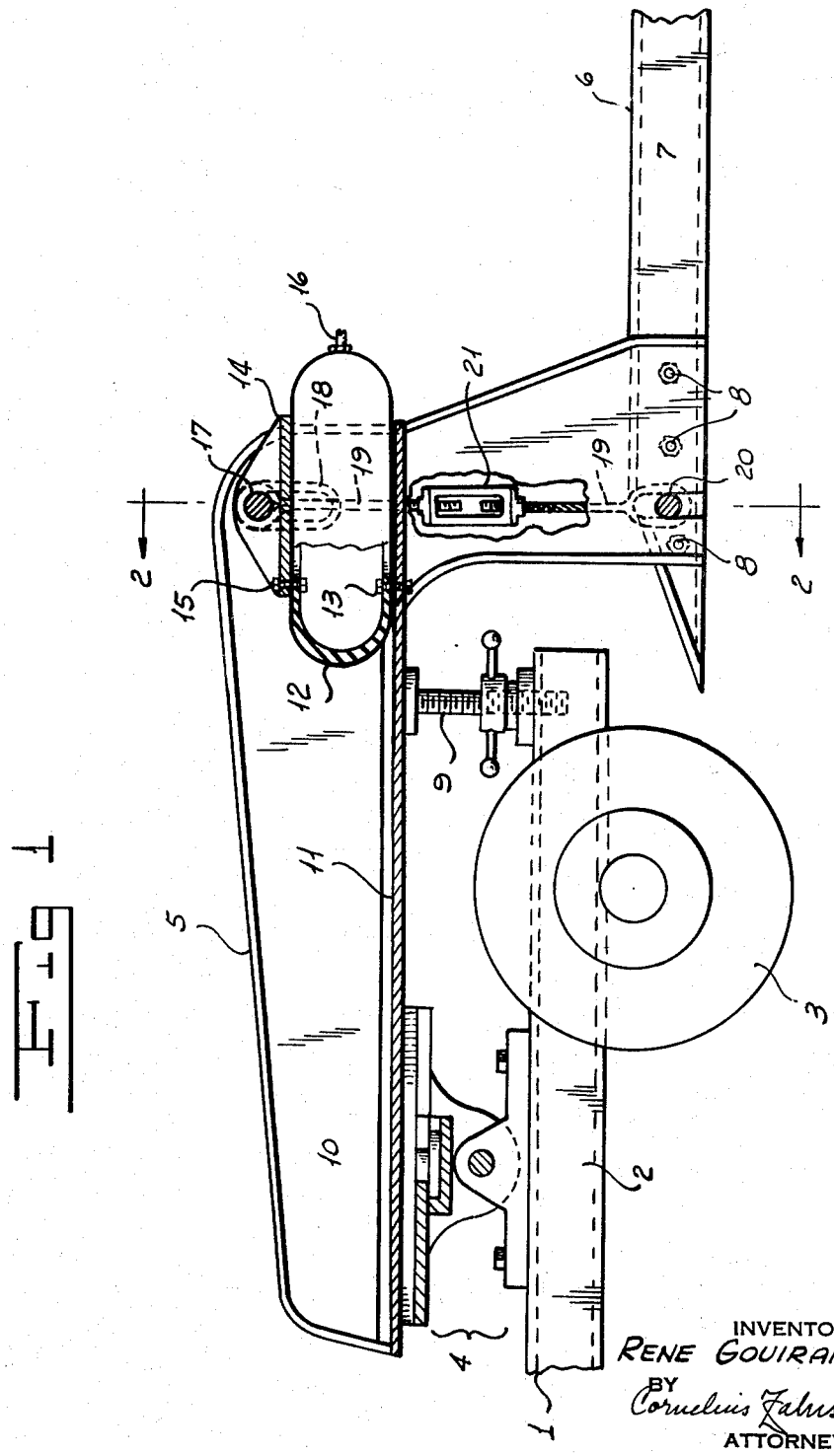
INVENTOR
RENE GOUIRAND
BY
Cornelius Fahnstee
ATTORNEY

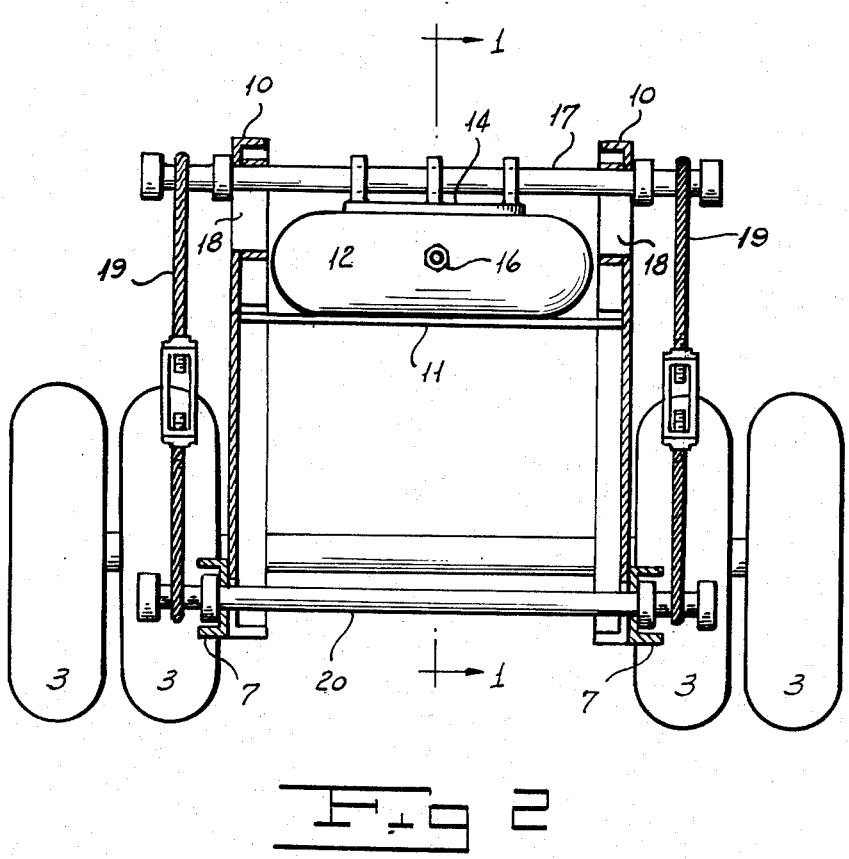

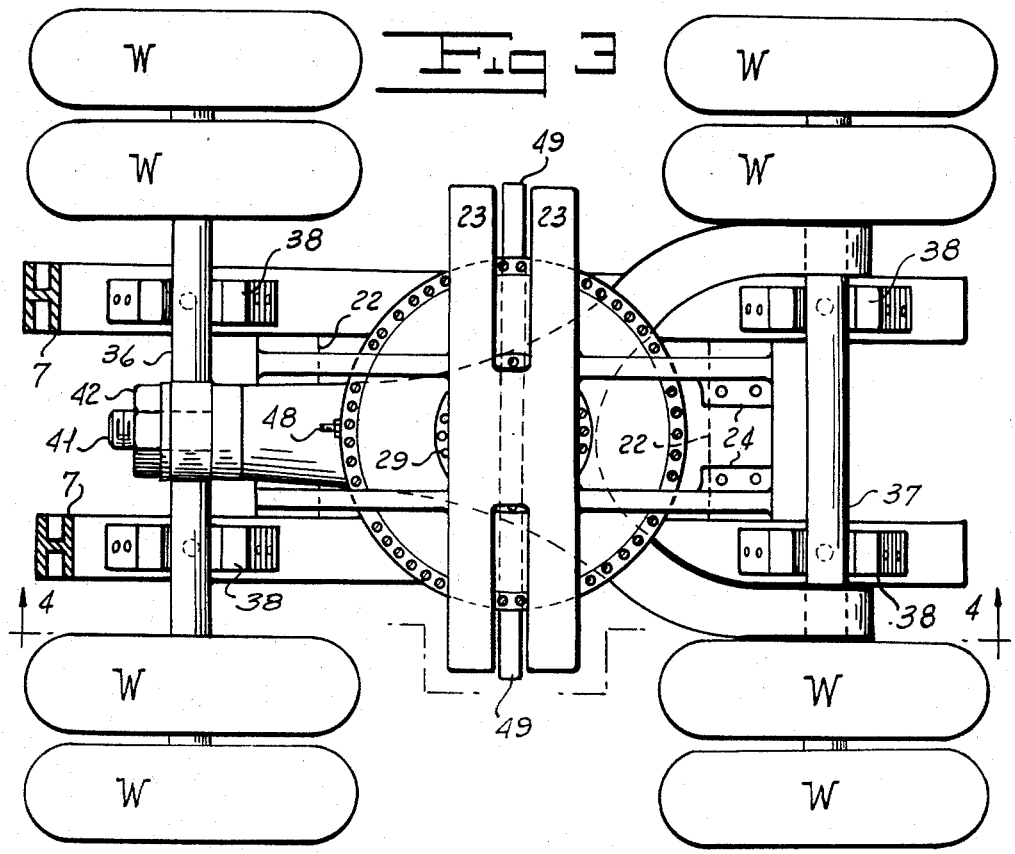
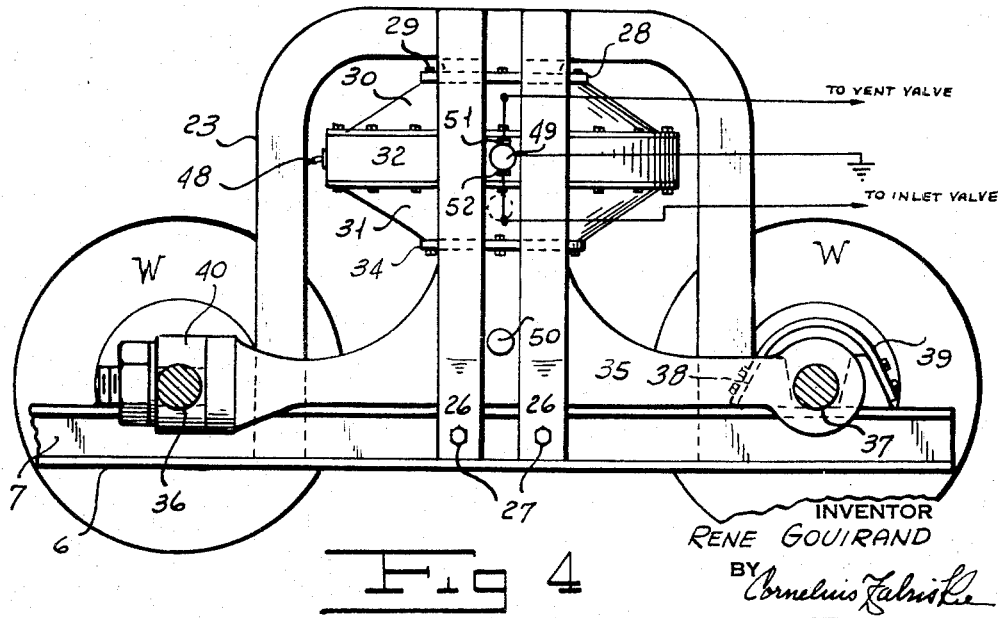

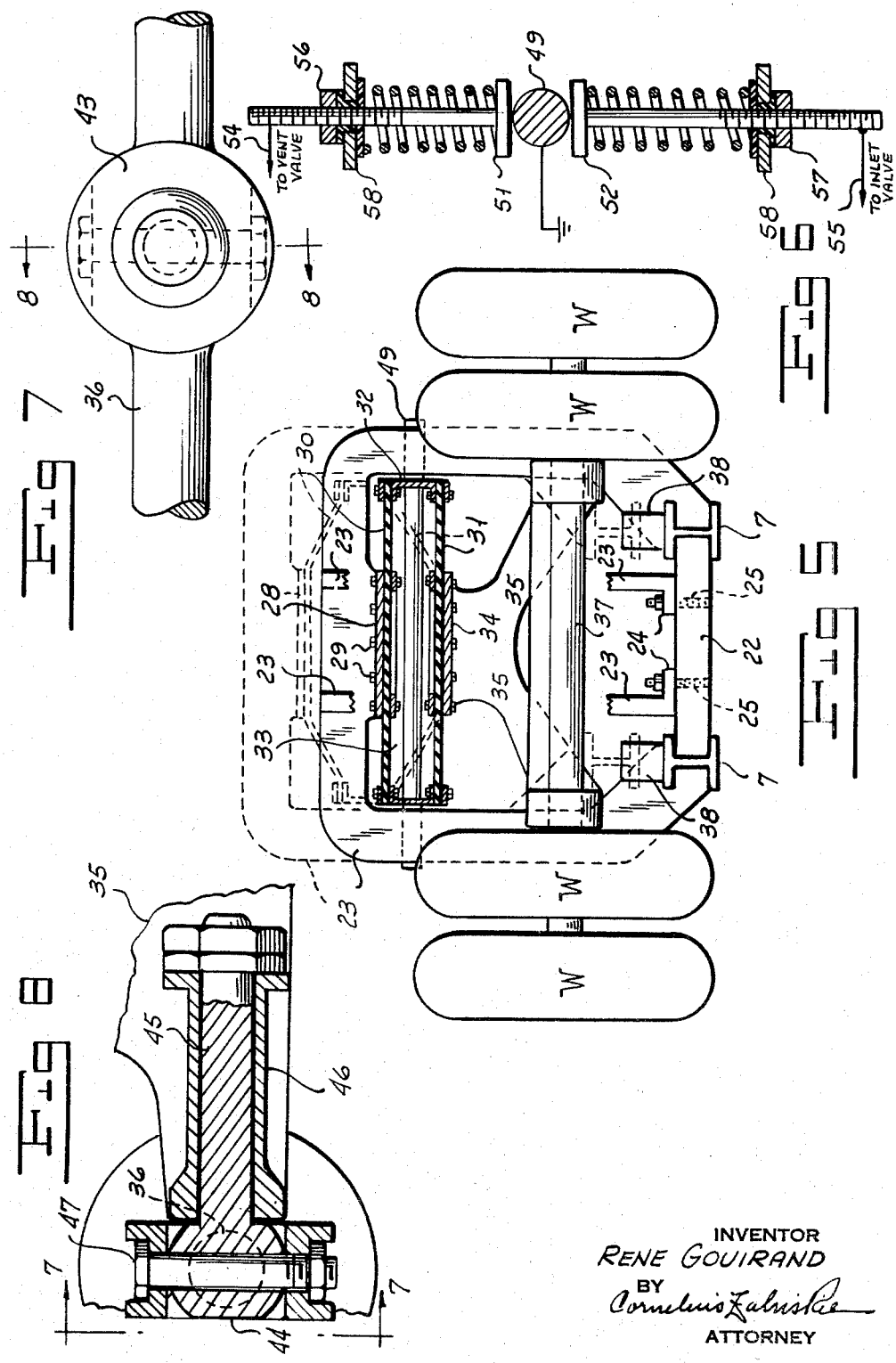

ns Patent Office 2,947,547
Patented Aug. 2, 1960

2,947,547

TRACTOR-TRAILER ASSEMBLY INCLUDING A PNEUMATIC SUSPENSION FOR THE TRAILER

Rene Gouirand, 210 W. 88th St., New York, N.Y.

Filed June 8, 1955, Ser. No. 513,961

6 Claims. (Cl. 280—43.23)

This invention is directed to a tractor-trailer assembly and more particularly to that underslung platform trailer type used to transport heavy loads, such as small houses, earth moving equipment, steam rollers, and the like, which because of their heavy weight require special equipment for the purpose.

Underslung trailers, employed for the purposes stated, comprise a supporting platform body commonly in the form of spaced apart heavy parallel side bars. The rear end of the body is supported on wheels, while the forward end is provided with a rigid bracket adapted to extend forwardly of the body and overlie the rear end of a tractor and a fifth wheel connection is provided between the tractor and the trailer to support the forward end of the body while permitting relative pivotal movement between the tractor and the trailer.

Even though the body of a trailer of this kind is underslung, the supporting surface thereof is generally several inches from the ground and in order to load the trailer with the article to be transported, it is generally necessary to jack up the article to an elevation where the trailer can be rolled beneath it or to rig a ramp and load the article by dragging the article up the ramp. This procedure requires time, the expenditure of much power and is altogether inconvenient.

The primary object of the present invention is to provide a tractor-trailer assembly so constituted that the trailer body may be entirely disconnected from either or both the wheeled running gear for its rear end and the supporting bracket at its front end so that either or both ends of the body may be lowered to ground level and then loaded by either moving such load onto the body up a relatively slight inclination of the body when one end only is at ground level or by sliding the body horizontally below the load, the body being then entirely free from any obstruction against such operation.

Another object of the invention is to provide means for readily detaching and subsequently attaching the bracket of the trailer to the forward end thereof, this means being in the main pneumatic in its nature.

Another object of the invention is to provide means for supporting the bracket of the trailer on the tractor while the bracket is detached from the trailer.

Another object of the invention is to provide means for supporting the rear end of the trailer upon wheels in such manner that the wheels and their connections with the body of the trailer may be removed from the trailer, so as to leave such body unencumbered thereby.

A further object of the invention is to provide a pneumatic suspension for the rear end of the trailer body so constituted that such pneumatic support may serve to lower the rear end of the body to ground level or lift and support it with the necessary road clearance.

Features of the invention, other than those adverted to, will be apparent from the hereinafter detailed description and appended claims when read in conjunction with the accompanying drawings.

The accompanying drawings illustrate one practical embodiment of the invention, but the construction therein shown is to be understood as illustrative, only, and not as defining the limits of the invention.

Fig. 1 shows the rear portion of a tractor and the forward portion of a trailer, the tractor being shown in elevation and the trailer and associated parts, including a portion of the fifth wheel, being shown in section on the line 1—1 of Fig. 2.

Fig. 2 is a section on the line 2—2 of Fig. 1 with the pneumatic member shown in elevation.

Fig. 3 is a plan view of the rear end portion of the trailer showing a wheeled support therefor.

Fig. 4 is a section on the line 4—4 of Fig. 3.

Fig. 5 is a rear elevation of the structure shown in Figs. 3 and 4 with the pneumatic suspension element in central section and with certain parts broken away in the interest of clearness.

Fig. 6 shows mechanism for controlling the inlet and outlet of air into the pneumatic suspension element.

Fig. 7 is a fragmental view showing a modified structure for mounting the forward axle of the tandem rear wheel assembly.

Fig. 8 is a section on the line 8—8 of Fig. 7.

Referring to the drawings, 1 designates a tractor of conventional form comprising a chassis 2 with wheels 3. Mounted on the chassis 2 of the tractor is a fifth wheel 4 of any appropriate kind by means of which there may be pivotally attached to the tractor the bracket 5 of a trailer, the body of which is indicated at 6. The body comprises load carrying side bars 7 and is supported at its rear end on a wheeled carriage or running gear hereinafter more fully described.

The bracket 5 is detachably secured to the forward end of the trailer body by bolts 8 which produce a rigid connection between the body and the bracket, but these bolts may be removed as and when desired so as to disconnect the forward end of the body from the bracket. In order that the bracket may be supported when disconnected from the body of a trailer, appropriate means is provided on the tractor, such, for example, as a screw jack 9, shown in Fig. 1.

The bracket comprises two side frames 10 between which is welded a platform 11 forming a bearing plate and on the rear end of this platform is affixed a horizontally disposed pneumatic member 12, similar in shape to the casing of a pneumatic tire and having flexible walls so that it constitutes and acts as, in effect, an expandable and collapsible bag. It may be made of rubber or any other suitable material well able to withstand internal pressures. The lower side of the pneumatic member is secured by bolts 13 or in any appropriate manner to the platform 11 of the bracket to form therewith an air-tight joint, while the upper portion of said member is secured to a superimposed saddle or bearing plate 14 by bolts 15 or in any other appropriate manner to form a like air-tight joint. The pneumatic member has an appropriate nipple 16 through which air may be admitted to or vented from said member.

Extending transversely across and secured to the saddle 14 is a rod 17 shown best in Fig. 2. This rod passes through upright slots 18 in the two side frames of the bracket and attached to the protruding ends of said rod are tension members 19 which extend downwardly and are adapted to be detachably associated with a similar rod 20 which extends transversely of and through the side bars 7 of the body 6. The tension members 19 may be in the form of cables, chains, rods or the like and are of sufficient strength to support the forward end of the body 6 even when the body is loaded. Some appropriate means may be provided for adjusting the tension members 19 to the desired length and when cables are employed turn buckles 21 serve this purpose very nicely.

In preparing a tractor-trailer combination, as thus far described, for loading a heavy article onto the body 6, the tractor is brought into position adjacent the article. Compressed air is then introduced into the pneumatic member 12 under sufficient pressure to take up the slack in the tension members 19 and place them under sufficient tension to support the forward end of the body 6. The jack screw 9 or other equivalent device is then manipulated to engage the under side of the platform 11, as shown in Fig. 1. The bolts 8 which secure the bracket to the side bars of the trailer are then removed and, after the side bars are thus freed from attachment to the bracket 5, the pressure within the pneumatic member 12 is slowly released with the result that the forward end of the body 6 of the trailer is lowered into contact with the ground. The tension members are then removed from the cross rod 20 and the tractor, thus disengaged from the trailer, is moved off, leaving the forward end of the trailer body resting on the ground. If necessary this forward end may then be shifted by crowbar or in any other suitable manner into a position contiguous to the article to be loaded and the article may then be loaded onto the body.

After the article has been loaded, the tractor is backed into position wherein the rear lower end of the bracket is directly above and straddling the side bars 7 of the body 6, the tension members 19 are then engaged with the opposite ends of the rod 20 and compressed air is thereupon admitted into the pneumatic member 12 and, through the resulting vertical expansion of said member, the forward end of the trailer body is lifted until the bolt holes in the body register with the bolt holes in the bracket. The bolts 8 are then inserted through these holes and the nuts applied to re-establish a rigid connection between the bracket and the body. The jack screw 9 may then be lowered and the trailer-tractor combination is ready to transport the load. Arriving at destination, the front end of the trailer body may be lowered for ease in unloading, by reversing the operations hereinbefore described.

In the invention, as thus far described, the rear end of the body remains supported on rear wheels during the loading and unloading of the body. However, the present invention provides means whereby the rear end of the body may be lowered to ground surface for loading purposes, either separately from or conjointly with the forward end of such body. The mechanism whereby this is accomplished is disclosed in Figs. 3–8 of the drawings.

Extending transversely between the side bars 7 of the body and near the rear end thereof are two transverse supporting members 22 spaced apart longitudinally of the body and welded firmly to the side bars 7. On these side bars is seated an upright frame 23 which may be in the form of a casting or it may be fabricated and the parts thereof welded together. The opposite ends of this frame are provided at their bases with flanges 24, as shown in Figs. 3 and 5, and these flanges are perforated to fit over studs 25 threaded into the transverse supports 22. Nuts are applied to the studs above the flanges to detachably secure the opposite ends of the frame to the supports 22. The frame is also provided at its lateral edges with upright members 26 adapted to be secured by bolts or studs 27 to the side bars of the body 6. By thus mounting the frame 23 upon the body, it may be readily removed by simply removing the bolts 27 and the nuts of the studs 25.

Positioned on the under side of the upper portion of the frame 23 is a bearing plate 28 which is secured by bolts 29 or in any other convenient manner to the central portion of an upper diaphragm 30 positioned directly above a lower diaphragm 31. Both of these diaphragms are coaxially arranged and their outer peripheries are secured to the upper and lower edges of a relatively deep ring 32, the joint between the diaphragms and the ring forming a seal against leakage of compressed air adapted to be admitted into the pneumatic chamber 33 thus formed.

To the under side of the center of the lower diaphragm is secured a lower bearing plate 34 which forms part of a yoke 35. This yoke is skeletonized and extends fore and aft of the lower bearing plate 34 and is attached to front and rear axles 36 and 37 of tandem wheels indicated at W. The rear axle 37 extends through bearings in the rear end of the yoke 35 and seats in V-shaped stirrups 38 mounted on the side bars 7 of the body and, in practice, these stirrups are preferably lined with some resilient material, such as rubber, to cushion the engagement between them and the axle to permit a fairly loose mounting to take care of sway and permit proper tracking. Each stirrup moreover is preferably provided with a strap retainer 39 overlying the axle so as to preclude its inadvertent disengagement with the stirrups. Fig. 4 shows the retainer 39 in place while it is removed in Fig. 3 to better show the stirrups.

In Figs. 3 and 4, the front axle 36 is shown as having a central enlarged cylindrical portion 40 which is perforated to embrace a stud 41 extending forwardly from the yoke and a nut 42 secures the axle to the yoke in such manner as to permit pivotal movement of the axle on the stud. This arrangement provides in effect a three point suspension for the yoke which eliminates undesirable torque strains on the yoke when the wheels are passing over an uneven surface.

At either side of the pivotal connection referred to, the front axle has associated therewith stirrups mounted on the side bars of the body in the same manner as described with reference to the rear axle. All stirrups are preferably detachably secured to the side bars of the body, so that they may be easily removed when desired.

In the construction of Figs. 3 and 4, the axles 36 and 37 are at all times maintained in parallel relation. This arrangement may be utilized if desired. However, it will sometimes be convenient to pivotally support the front axle 36 to permit of its movement out of parallel relation with the rear axle in a horizontal plane, so that, when the yoke and its frame, axle and wheels are all disconnected from the body, these parts, as a unit, may be moved away from the body and steered through pivotal movement of the front axle. This may be accomplished by substituting for the stud connections shown in Figs. 3 and 4, the construction shown in Figs. 7 and 8. Here the front axle 36 has a central enlarged cylindrical portion 43, as in the preceding figures, but the opening therein is somewhat larger, so that it may receive the head 44 of a stub shaft 45 mounted for pivotal movement on a horizontal axis in a bearing 46 formed in the forward end of the yoke. This stub shaft permits of the tilting of the axle on a horizontal axis to give the advantages of the three point suspension hereinbefore referred to, while the ability to steer the unit is afforded by passing a bolt 47 through the enlarged portion of the axle and through the head 44 and by so forming the head that those parts thereof which engage with the axle are spherical surfaces. With this arrangement, the front axle can tilt in a vertical plane and pivot about the bolt 47 in a horizontal plane. However, as long as the axle is supported by attachment of the frame 23 to the body of the trailer, said front axle will be maintained in parallel relation to the rear axle by the stirrups 38.

It is of course essential in the operation of a trailer of this kind that the axles 36 and 37 may be maintained normal to the direction of movement of the body. The stirrups 39 will serve to accomplish this result. However, this may be accomplished independently or accumatively by either one or both of the bars 49 and 50. I preferably use two. The bar 49 extends transversely through the pneumatic chamber, as shown in Figs. 3–5, and projects between the side members 26 of the frame 23. The bar 50 is arranged in like manner, but extends through the yoke at a lower elevation. These bars not only help to maintain the axles normal to the direction of movement of the body, but they also take up pulling and braking strains which would otherwise be imparted to the diaphragms and are therefore highly desirable in this connection.

Under ordinary conditions with the running gear as shown in Figs. 3 and 4, compressed air under sufficient pressure will have been admitted through a nipple 48 into the pneumatic chamber 33 to expand the diaphragms 30 and 31 of that chamber upwardly and downwardly respectively, as shown in Fig. 4, to elevate and maintain the rear end of the body 6 above the ground surface in order to give the desired road clearance during transportation. In order that this pressure may be maintained substantially constant, I provide automatic means shown diagrammatically in Fig. 4 and in more detail in Fig. 6. This means consists of two spring pressed electrically conductive contacts 51 and 52, the former of which is positioned directly above one projecting end of the upper bar 49, while the other is positioned directly below the same. The bar 49 is electrically grounded on the body 6, while the spring pressed contacts 51 and 52 are connected by wires 54 and 55, respectively, to an appropriate vent valve and to a compressed air inlet valve. This compressed air inlet valve leads to a suitable source of air under pressure, so that, when a circuit is completed through contact between the bar 49 and the contact 52, the inlet valve will be open and compressed air will be fed to the pneumatic chamber 33. When the bar 49 engages with the contact 51, a vent valve will be opened and the pneumatic chamber 33 will be vented to the atmosphere. The normal relative position between the contact 51 and 52 may be controlled by adjusting nuts 56 and 57, respectively, which screw onto the threaded stems of the respective contacts 51 and 52. These two stems pass through insulating bushings in brackets 58 secured to the side members 26 of the frame 23.

The mechanism shown in Fig. 6 is duplicated at both sides of the frame with multiple connections to include both contacts 51 in the circuit 54 and both contacts 52 in the circuit 55. By adjusting the nuts 56 and 57 the amount of expansion of the diaphragms for a predetermined normal operation can be controlled, the arrangement being preferably such that, when the parts are in normal position, the rod 49 will be slightly spaced from both of the contacts 51 and 52.

When it is desired to lower the rear end of the body to ground level, the procedure next to be described is followed.

A manually operable valve connected to the inlet nipple 48 of the pneumatic chamber 33 is opened to completely vent this chamber and as the venting proceeds, the chamber will collapse into the condition shown in full lines in Fig. 5, thereby lowering the rear end of the body of the trailer to ground level. After it has been lowered, the frame 23 may be entirely released from the body 6 by removing the bolts 27 and the nuts from the studs 25 and thereupon the entire running gear consisting of the wheels, axles, frame, pneumatic chamber and yoke can be freely wheeled away from the back end of the trailer body and, if desired, the stirrups 38 may be removed so as to leave the rear end of the trailer body entirely unencumbered to facilitate loading. After the load has been placed on the body, the running gear is re-assembled on the body by reversing the operations described, the vent valve is closed and compressed air is admitted into the chamber 33 to return the parts to the relation shown in Figs. 3 and 4, and in dotted lines in Fig. 5.

It will be apparent from the foregoing that either or both ends of the trailer body may be pneumatically lowered to ground level and subsequently elevated to give the necessary road clearance and while at ground level either or both ends thereof will be wholly unencumbered against the movement of a load from the ground onto the body. That load may be moved onto the body over either end of the body as desired or it may be loaded onto the body intermediate the ends thereof in a lateral direction, whichever is the most convenient. Furthermore, by employing the pneumatic suspension which I have described for supporting the rear end of the body, the weight of the body and its superimposed load will be carried on an air cushion and thus vibration which might tend to shift the load on the body is minimized.

The foregoing detailed description sets forth the invention in its preferred practical forms, but the invention is to be understood as fully commensurate with the appended claims.

Having thus fully described the invention, what I claim as new and desire to secure by Letters Patent is:

1. A trailer comprising: a body provided at its forward end with a bracket rigidly and detachably secured to the body, a vertically expandable and contractable pneumatic chamber mounted on the bracket independently of and above the body with the bottom of said pneumatic chamber supported on the bracket and the top of said pneumatic chamber free to raise and lower, links secured at their upper ends to the top of said pneumatic chamber and at their lower ends to the body, and means for admitting compressed air into the pneumatic chamber and for venting said chamber for the purpose of raising the forward end of the body from ground level to engagement with the bracket or for lowering the forward end of the body from engagement with the bracket to ground level, when the bracket is detached from the body.

2. A trailer according to claim 1, wherein the upper ends of the links are secured to a yoke seated on the top of the pneumatic chamber.

3. A trailer according to claim 2, in combination with a tractor pivotably secured to the forward portion of the bracket, and a vertically adjustable strut interposed between the bracket and tractor for supporting the rear portion of the bracket above and free from the ground while said bracket is detached from the body.

4. A trailer according to claim 3, wherein said strut is a jack screw.

5. In an assembly of the character described: a wheeled running gear, a horizontal bearing plate supported by the running gear at a predetermined distance from and above the latter, a trailer body, a horizontal bearing plate supported on the body at a predetermined distance above the body and vertically spaced from the bearing plate of the running gear, there being interposed between said horizontal bearing plates a pneumatic cushion vertically expandable and contractable sufficiently to lift said body from contact with the ground when the cushion is vertically expanded and to lower said body into contact with the ground through contraction of the cushion, and means for inflating and deflating said cushion to thus vertically expand and contract the latter.

6. A pneumatic suspension comprising: a trailer body, a rigid upright frame mounted on the trailer body and provided with a bearing plate, a wheeled running gear provided with a bearing plate positioned in spaced relation to and below the bearing plate of the frame, a vertically expandable and contractable pneumatic cushion interposed between the bearing plates of the frame and running gear and adapted to support the trailer body free from the ground when the cushion is inflated and to lower the trailer body to ground level when the cushion is deflated, and means for inflating and deflating said cushion, said rigid upright frame having upright guides vertically movable therewith and the running gear being provided with pins operable in said guides to relieve the pneumatic cushion from braking and draft strains, in combination with contacts mounted on and movable with the frame and arranged above and below said pins, and electrical circuits including the pins and said contacts and also including compressed air inlet and vent valves, whereby air pressure in the cushion may be controlled according to the loading of the trailer body.

References Cited in the file of this patent

UNITED STATES PATENTS

| | | |
|---|---|---|
| 2,094,882 | Garnett | Oct. 5, 1937 |
| 2,318,257 | Peterman | May 4, 1943 |
| 2,325,869 | Mosling | Aug. 3, 1943 |
| 2,350,841 | Troche et al. | June 6, 1944 |
| 2,361,166 | Ayers | Oct. 24, 1944 |
| 2,415,706 | Ronk | Feb. 11, 1947 |
| 2,475,443 | Bill | July 5, 1949 |
| 2,480,909 | Davis | Sept. 6, 1949 |
| 2,663,569 | Gouirand | Dec. 22, 1953 |
| 2,683,611 | Shinn et al. | July 13, 1954 |
| 2,707,062 | Parker | Apr. 26, 1955 |
| 2,733,931 | Reid et al. | Feb. 7, 1956 |
| 2,771,303 | Frazier | Nov. 20, 1956 |